United States Patent [19]
Heyer et al.

[11] Patent Number: 6,015,629
[45] Date of Patent: Jan. 18, 2000

[54] STRESS CONTROL FOR TERMINATION OF A HIGH VOLTAGE CABLE

[75] Inventors: Thomas J. D. Heyer, Austin; Robert A. Wandmacher, Cedar Park; Lawrence C. Chor; John T. Larson, both of Austin, all of Tex.

[73] Assignee: 3M Innovative Properties Company, Saint Paul, Minn.

[21] Appl. No.: 09/148,249

[22] Filed: Sep. 4, 1998

Related U.S. Application Data

[63] Continuation-in-part of application No. 08/694,344, Aug. 8, 1996, Pat. No. 5,804,630, which is a continuation-in-part of application No. 08/524,390, Sep. 6, 1995, abandoned.

[51] Int. Cl.$^7$ .............................. B32B 15/06; H01B 7/00
[52] U.S. Cl. .................................. 428/625; 174/106 SC; 174/105 SC; 174/102 SC; 174/110 S; 174/73.1
[58] Field of Search ................... 428/625; 174/106 SC, 174/105 SC, 102 SC, 110 S, 73.1

[56] References Cited

U.S. PATENT DOCUMENTS

| | | | |
|---|---|---|---|
| 3,515,798 | 6/1970 | Sievert | 174/135 |
| 3,673,305 | 6/1972 | Mashikian et al. | 174/12 BH |
| 3,859,576 | 1/1975 | Sheckler et al. | 317/262 |
| 4,017,652 | 4/1977 | Gruber | 427/54 |
| 4,203,886 | 5/1980 | Hirai et al. | 260/37 |
| 4,234,439 | 11/1980 | Kehr et al. | 252/63.2 |
| 4,265,800 | 5/1981 | Newton | 260/37 |
| 4,363,842 | 12/1982 | Nelson | 428/36 |
| 4,378,463 | 3/1983 | Senior et al. | 174/73 |
| 4,383,131 | 5/1983 | Clabburn | 174/73 |
| 4,412,029 | 10/1983 | Kehr et al. | 524/441 |
| 4,431,861 | 2/1984 | Clabburn et al. | 174/73 R |
| 4,470,898 | 9/1984 | Penneck et al. | 252/511 |
| 5,010,137 | 4/1991 | Umeda et al. | 525/104 |
| 5,098,752 | 3/1992 | Chang et al. | 428/34.9 |
| 5,455,383 | 10/1995 | Tanaka | 174/36 |
| 5,804,630 | 9/1998 | Heyer et al. | 524/436 |

FOREIGN PATENT DOCUMENTS

| | | | |
|---|---|---|---|
| 0297414A2 | 2/1988 | European Pat. Off. | C08L 83/07 |
| 0424090B1 | 10/1990 | European Pat. Off. | H02G 15/18 |
| 0435554A2 | 12/1990 | European Pat. Off. | C08L 83/04 |
| 2371804A | 11/1976 | France | H02G 15/02 |

*Primary Examiner*—Margaret G. Moore
*Attorney, Agent, or Firm*—Matthew B. McNutt

[57] ABSTRACT

A two-part system for electrical stress control includes a non-tacky conformable stress control material that is positioned at the shield cut edge of a prepared power cable and a stress control tube over the non-tacky conformable stress control material. A second region of conformable stress control material is positioned adjacent the cut end of the insulation.

8 Claims, 5 Drawing Sheets

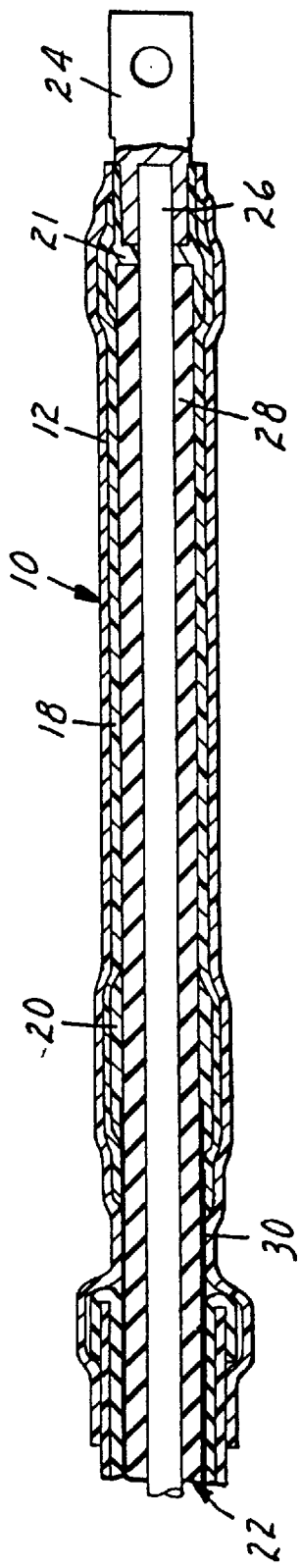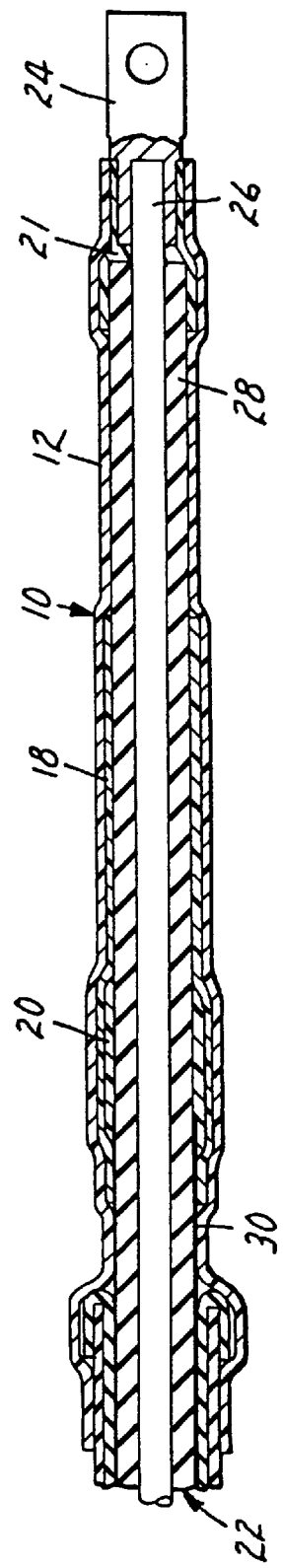

STRESS CONTROL FOR TERMINATION OF A HIGH VOLTAGE CABLE

This application is a Continuation-In-Part of U.S. patent application Ser. No. 08/694,344, filed on Aug. 8, 1996, now U.S. Pat. No. 5,804,630, which is a Continuation-In-Part of U.S. patent application Ser. No. 08/524,390, filed on Sep. 6, 1995, now abandoned.

BACKGROUND OF THE INVENTION

1. Field of the Invention

The present invention relates to electrical stress control and more particularly to a method and an arrangement to control electrical stress in a region of high electric field strength associated with high voltage electrical equipment. Specifically, it relates to an article which uses nontacky core-loadable epihalohydrin polymer compositions which exhibit effective stress control when used at the edge of a semi-conductive shield in a termination either alone or in conjunction with a high dielectric constant tube.

2. Description of the Art

It is well known to employ stress control means to control electrical stress in a region of high electrical field strength due to a shield discontinuity in high voltage cable or electrical equipment, for example, electrical bushings, and joints or terminations of high voltage cables. Such stress control means typically comprise stress cones and tapes or tubular articles of semi-conductive stress control material. This invention is directed to stress control means comprising high permittivity stress control material which provides improved corona discharge extinction, power frequency voltage withstand and impulse voltage withstand performance over prior art arrangements using such stress control means. For purposes of illustration, this invention is described primarily as it applies to a termination of a high voltage cable. The invention can be applied, however, to other electrical cable or equipment where stress control is desired.

A typical high voltage cable includes an inner conductor surrounded by a conductor shield which is, in turn, surrounded by an insulating material that is surrounded by an outer electrically semi-conductive shield, in some instances, and metal shield. In terminating such a cable, it is customary to remove or cut back each successive layer of the cable to expose the layer below. Cutting back the electrically semi-conductive shield causes a discontinuity in the electric field resulting in high electric stress at the end of the shield. The high electrical stress can cause electrical discharges to occur, which in turn tend to cause breakdown of the insulation of the cable. The high electrical stress can be controlled by electrical stress control means.

High-voltage alternating current cable terminations are generally tested in the U.S. under the IEEE standard test procedure Std. 48-1990. This procedure sets forth, inter alia, design tests to be performed by the manufacturer to obtain information on the performance of a high voltage cable termination.

The design tests of the IEEE procedure that are particularly useful in determining the effectiveness of a termination which includes a stress control arrangement include the "Partial Discharge (Corona) Extinction Voltage Test," the "Power Frequency Voltage Withstand Test" and the "Lightning Impulse Voltage Withstand Test." In the discharge extinction voltage test, electrical discharge in the termination is measured at specific applied voltages and has to be below specific values. Also the voltage at which the discharge extinguishes is measured and has to be above specific values. In the power frequency voltage withstand tests the specified voltage is applied to the cable and should be withstood without flashover or other dielectric breakdown. In the impulse voltage withstand test, impulses of specific value and waveform are applied to the cable and should be withstood without flashover or other dielectric breakdown. The voltage at which flashover occurs should be above specific values. The discharge, power frequency voltage and impulse voltage performance of the termination should meet the requirements set forth in the IEEE Standard Test procedures STD 48-1990.

The use of stress control material in high voltage cable terminations does not always produce terminations that meet the impulse performance requirements of the IEEE test procedures. In order to meet this requirement the stress control arrangement may be augmented by the use of rain sheds. While sheds are typically employed with outdoor terminations for other purposes, they are not generally employed when the cable termination is installed indoors. Since the use of sheds adds to the cost of the termination and requires additional space around the cable, it is desirable to be able to dispense with the use of the sheds yet still meet the desired impulse performance.

Various compositions have been used in coordination with such articles to provide electrical stress control and sometimes to bond them to various types of pipe and tubing, e.g., mastics, tapes, and greases as in U.S. Pat. Nos. 4,017,652, and 4,383,131.

U.S. Pat. No. 4,363,842 discloses elastomeric pre-stretched tubes formed from EP or EPDM with a variety of fillers including carbon black, conductive particles and the like, including carbon black, and aluminum flakes. Barium titanate is disclosed for providing stability of permittivity over a wide range of electrical stresses; barium titanate does not provide higher permittivity to the elastomeric tubes.

Heat-recoverable articles may also be provided on an inner tube, which breaks and allows the elastomeric member to recover. These articles are heated with a hot air gun or torch, to initiate recovery.

Both types of articles may recover around the cable joint or termination (or other substrate) tightly in areas, and have air pockets between the cable and the substrate about which it is recovered in other areas, such as a semiconducting layer edge, which is highly undesirable. Sealing compositions, such as greases and the like have been used with these articles to reduce or eliminate such air pockets.

EP Patent 0424 090 B1 discloses an elastomeric covering for connections in electrical cables having a conformable material interposed between the prestretched tube and the core, whereby when the core is removed, the elastic forces change the shape and dimensions of the material to correspond to the underlying surface. No electrical properties are disclosed, and a broad range of materials are simply listed.

U.S. Pat. No. 4,378,463 discloses an adhesive for use in heat recoverable products in areas of electrical stress. The adhesive comprises an epihalohydrin polymer, a tackifier, a catalyst, and a particulate filler. The composition bonds the heat-recoverable article to the substrate, and also provides electrical stress relief. No polymer blends are disclosed.

However, the above composition has some disadvantages. First, it must be provided separately, and cannot be pre-loaded into the splice or termination as the composition will adhere thereto or to the core and either prevent its removal when it is time to initiate recovery or deform and fracture during removal, causing the formation of large air pockets.

Applicant has discovered that a non-tacky stress control material containing an epihalohydrin polymer, and an insulative polymer having a tan δ of less than 1, and having certain fillers provides unique electrical properties for use in stress control, i.e., excellent permittivity. Such compositions exhibit synergism between the combination of polymers and the fillers not seen when only one type of polymer is used with the same fillers. The materials have significantly improved results on electrical properties such as permittivity, alternating current voltage withstand tests, impulse withstand, and/or tan δ values.

Further, compositions of the inventive stress control material may be aged in cable oil and neither swell nor lose their electrical properties.

The stress control material compositions may be used alone inside the insulator of an electrical cable, and are suitable for pre-loading in an elastically shrinkable tube such as a splice cover or termination supported on a removable rigid core, or underneath a pre-stretched elastomeric or heat shrinkable stress control tube.

The present invention, provides a novel arrangement using a unique stress controlling material that significantly improves the termination's discharge, power frequency voltage and impulse voltage performance with or without the use of sheds. While the present invention is primarily described in connection with a termination of a cable, it is suitable for employment with high voltage cable joints and other high voltage equipment including electrical bushings and feedthroughs.

SUMMARY OF THE INVENTION

The present invention includes an elastically recoverable elastomeric insulating sleeve which is provided with an inner support or "core" which holds the sleeve in a stretched condition. The sleeve is placed over the power cable and the core is unwound and removed, allowing the sleeve to contract into contact with the cable. Between the sleeve and the core is disposed a two-part stress control system consisting of a non-tacky, void-filling conformable stress control material surrounded by an elastomeric stress control tube. Both the conformable stress control material and the stress control tube have high permittivity (greater than 10).

The inventive non-tacky electrical stress control material comprises
 a) 100 parts of a resin component containing
  1) from 20% to 80% of an epihalohydrin polymer, and
  2) correspondingly, from 80% to 20% of a silicone polymer having a tan δ of less than one,
 b) from 10 to 200 parts of a filler, said filler being nonconductive at room temperature, selected from the group consisting of barium titanate and hydrated aluminum silicate, and
 c) from 0 to 30 parts of a plasticizer.

Preferred non-tacky electrical stress control materials comprise
 a) 100 parts of a resin component containing
  1) from 20% to 80% of an epihalohydrin polymer, and
  2) correspondingly, from 80% to 20% of a silicone polymer having a tan δ of less than one,
 b) from 80 to 120 parts barium titanate, and
 c) from 0 to 30 parts of a plasticizer.

The present invention defines relationships among the permittivities of the conformable stress control material and the stress control tube, the thicknesses of both members, and the length the conformable stress control material extends from the edge of the semi-conductive shield layer of the cable.

In a first embodiment of the invention, conformable stress control material is disposed in contact with the cut end of the cable shield and extends along the cable insulation. In a second embodiment of the invention, a conformable stress control material is also in contact with the cut end of the cable insulation and lug.

The following terms have the defined meanings when used herein.

1. The term "elastically shrinkable" means that an article so described is in a stretched or radially expanded condition and will shrink to another condition when permitted to do so, with no heat required.

2. The term "cold-shrinkable" is synonymous with the term "elastically shrinkable".

3. The term "core" refers to the supporting article upon which the elastically shrinkable article is deformed in a radially expanded or stretched condition.

4. The terms "insulator" and "insulative polymer" means a polymer with a volume resistivity greater than $10^{10}$ ohm-cm.

5. The term "epihalohydrin polymer" includes homopolymers, copolymers, terpolymers, etc.

6. The term "tan delta" or "tan δ" refers to the electrical dissipation factor.

7. The term "permittivity" or "relative permittivity" is the ratio of electric flux generated by an electrical field in a medium to that generated by the field in a vacuum.

8. The term "sintilation" is localized electrical discharge on the surface of an insulator that often precedes flashover of a high-voltage non-shielded cable accessory.

9. The term "dielectric constant" is synonymous to relative permittivity.

All ratios, parts, and percents described herein are by weight, unless otherwise specifically stated.

BRIEF DESCRIPTION OF THE DRAWINGS

The present invention will be described with respect to the accompanying drawings, wherein like numbers refer to like parts in the several views, and wherein:

FIG. 4 is a cross-sectional view of an alternate embodiment of the stress control termination sleeve of the present invention as applied to an electrical power cable.

FIG. 5 is a cross-sectional view of yet another alternate embodiment of the stress control termination sleeve of the present invention as applied to an electrial power cable.

DETAILED DESCRIPTION OF THE INVENTION

Figure 1:
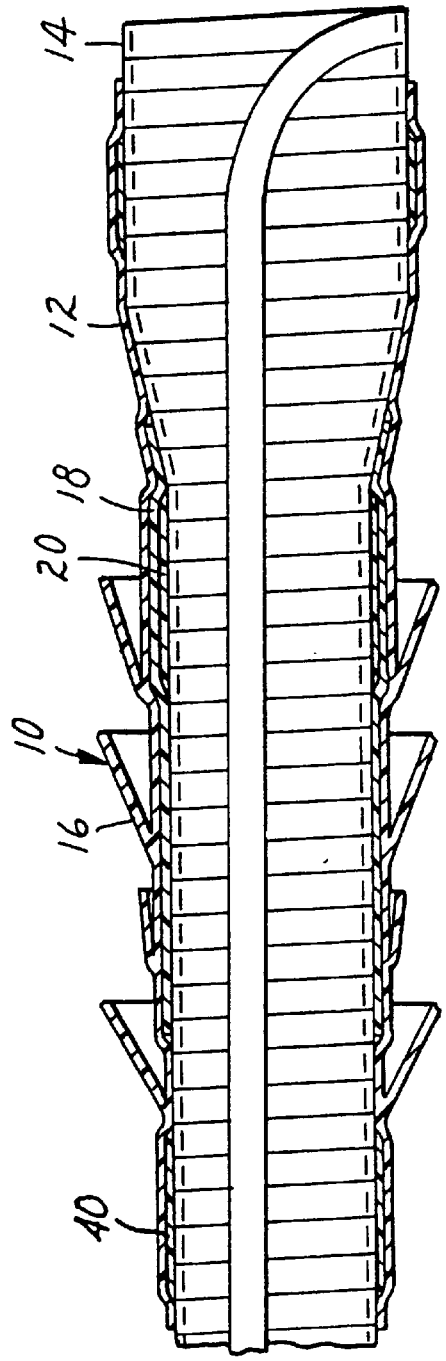
FIG. 1 is a cross-sectional view of a stress control termination sleeve of the present invention with rain sheds.

FIG. 1 illustrates a termination assembly, generally indicated as 10, according to one embodiment of the present invention. The assembly 10 is a pre-stretched tubular sleeve 12 supported in the stretched condition by an easily removable core 14. The assembly 10 is typically designated a "PST", which stands for pre-stretched tube. Such an assembly 10 is taught in U.S. Pat. No. 3,515,798, incorporated herein by reference. Preferably the core 14 is a one-piece rigid spiral core having interconnected adjacent coils in a closed helical configuration, as described in U.S. Pat. No. 3,515,798. The outer sleeve 12 is preferably silicone rubber, although a wide variety of materials may be used so long as they possess the required arc and track resistance, ultraviolet resistance and ability to stretch and recover substantially their original dimensions when the core 14 is removed.

Figure 2:
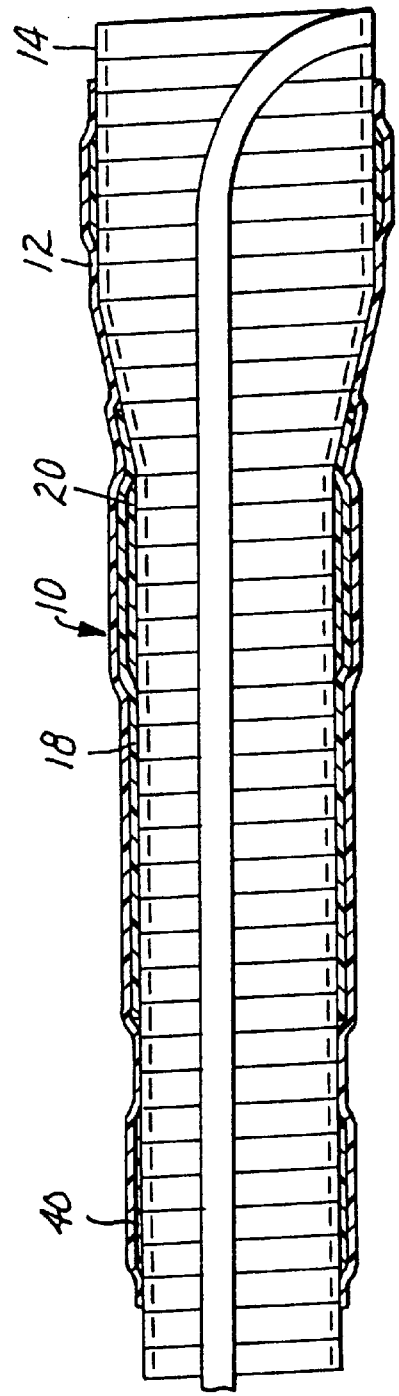
FIG. 2 is a cross-sectional view of the stress control termination sleeve of the present invention without rain sheds.
Figure 3:
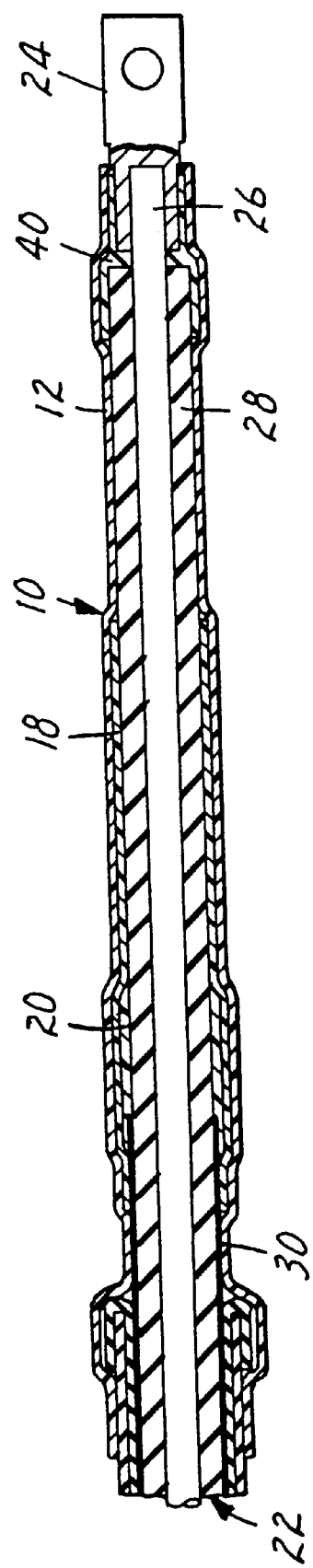
FIG. 3 is a cross-sectional view of the stress control termination sleeve of the present invention as applied to an electrical power cable.

The termination assembly of FIG. 1 is primarily intended for outdoor use and so includes rain sheds 16 which increase the tracking length along the length of the sleeve 12. Space is usually more critical in indoor applications, so the rains sheds 16 are usually dispensed with in these situations, as shown in FIG. 2. Either termination assembly 10 is applied as shown in FIG. 3 to an electrical power cable 22 which has a suitable terminating device such as the lug 24 shown crimped to the conductor 26 of the cable 22.

To apply the lug 24 and thus terminate the cable 22, the cable 22 must be prepared by removing a predetermined length of insulation 28 covering the conductor 26 and a greater predetermined length of semi-conductive shielding 30 covering the insulation 28. Cutting back the shield 30 causes a discontinuity in the electrical field surrounding the conductor 26 which results in high electrical stresses an the end of the shield 30. The high stress can cause electrical discharge to occur, which in turn may cause breakdown of the insulation 28 of the cable 22 or the termination sleeve 12. The present invention is intended to control these high electrical stresses to avoid these undesirable results.

Electrical stress control in the preferred embodiment is provided in the termination 10 by the combined use of a high permittivity stress control tube 18 lining a portion of the sleeve 12, and a unique conformable stress control material 20 within the stress control tube 18. The thicknesses of the stress control tube 18 and the conformable stress control material 20, the length of the conformable stress control material 20 and the permittivity of both the stress control tube 18 and the conformable stress control material 20 are controlled to accomplish the desired stress control within the termination assembly 10.

The high permittivity stress control tube 18 is described generally in U.S. Pat. No. 4,363,842, which is incorporated herein by reference. The article taught in that patent has been modified somewhat to produce the preferred stress control tube 18 defined by the following composition:

| | Parts by Weight |
|---|---|
| Nordel 1470 (Tradename for an ethylene/propylene/diene monomer rubber commercially available from Dupont) | 50 |
| Nordel 1440 (Tradename for an ethylene/propylene/diene monomer rubber commercially available from Dupont) | 50 |
| Zinc oxide (French Process) | 5.0 |
| ARO60 Carbon Black (a N754 grade, large particle size carbon black commercially available from J. M. Huber) | 71.35 |
| 4X Mineralite Mica (commercially available from Thompson Hayward Chemical) | 20 |
| D-148 (Tradename for a processing aid commercially available from Ventron) | 2.0 |

-continued

| | Parts by Weight |
|---|---|
| Struktol WB-16 (Tradename for a mixture of fatty acid soap, predominantiy calcium, available from Struktol Company) | 2.0 |
| EF (A-172) D-50 (Tradename for a vinyl silane coupling agent predispersed on a hydrocarbon wax commercially available from Elastochem) | 1.0 |
| Sunpar 2280 (Tradename for a paraffinic process oil commercially available from the Sun Company) | 9.8 |
| Plasthall DOZ (Tradename for Di-2-Ethylhexyl Azelate commercially available from C. P. Hall Co.) | 13.3 |
| Plasthall DIDG (Tradename for Diisodecyl Glutarate commercially available from C. P. Hall Co.) | 13.3 |
| Silvex 113-20-C (Tradename for a mineral oil treated aluminum flake of 22 micron average particle diameter commercially available from Silberline Manufacturing) | 8.5 |
| Drimix SR-297-75E (Tradename for 1,3 butylene dimethacrylate dispersion commercially available from Kenrich Petrochemicals) | 7.0 |
| E (VC) D-40 (Trade name for a difunctional peroxide dispersion commercially available from Elastochem) | 4.5 |

The stress controlling materials of the invention comprise a resin component which consists of a blend of two polymeric resins; epihalohydrin polymers and insulating silicone polymers having a tan $\delta$ of less than 1.

Epihalohydrin polymers suitable for use in the compositions of the invention are the elastomeric polymers of an epihalohydrin in homopolymer or copolymer form. Such polymers are prepared by polymerization of the monomeric material in mass or in solution with organometallic catalysts, and may be homopolymers, copolymers, terpolymers, etc. Examples of homopolymers include epichlorohydrin, or epibromohydrin; useful copolymers include copolymers of epihalohydrins with alkylene oxides, and copolymers with epoxides, e.g., propylene oxide, ethylene oxide, butene oxide, and epoxy ethers such as ethylglycidyl ether, allylglycidyl ether and the like. Such polymers are available from Zeon Chemicals, Inc.

Preferred epihalohydrin polymers include copolymers with alkylene oxides, particularly ethylene and propylene oxides.

The resin component also contains an insulating silicone polymer having a tan $\delta$ of less than one. Useful silicones include silicones which are fluid at room temperature and gum silicones; gum silicones preferred for easy compounding and processability; most preferred are those gum silicones having a durometer of from 5 to 30. Surprisingly, silicone polymers having a durometer of 5 or more can be mixed with the epihalohydrin, and provide a product which exhibits faster flow, lower viscosity and a lower plasticity. The preferred silicones also exhibit a plasticity of less than 250, preferably less than 230.

Commercially available silicone elastomers include those fluid silicones available as Dow Corning DC 10,000, and the like, and gum silicones available as Elastosil® R 300/40, and Wacker 7805 and 7815 from Wacker Silicones Corporation; Silastic® GP31 from Dow Corning, and the like.

The silicone polymer and the epihalohydrin are present in the resin component at a ratio of from 20:80 to 80:20, preferably from about 70:30 to about 30:70. Formulations comprising less than 20% insulative polymer may be useful in some applications but exhibit high tan δ values, which is undesirable for high voltage applications.

The composition contains from 10 to 200 parts per hundred resin (pph) of at least one particulate filler selected from fillers which are nonconductive at room temperature. Preferred fillers are aluminum silicate and barium titanate. Preferred materials comprise from 25 to 100 parts aluminum silicate or from 50 to 200 parts barium titanate. The most preferred filler is barium titanate. These resin blends show synergistic behavior with these fillers. Barium titanate is available from Ferro Corp. as Transelco 219-3, and hydrated aluminum silicate is available from J. M. Huber as Suprex®.

Materials of the invention exhibit significant improvements in electrical properties. Barium titanate containing materials exhibit improvement in permittivity and alternating load current withstand voltage, i.e., preferred materials exhibit both permittivities of above 15 and tan δ of less than 4, preferably around 1. Further, terminations employing materials of the invention show improvements in AC withstand; withstanding about 100 kV, terminations employing preferred materials withstand about 110 kV, as opposed to 95 kV or less for current conventional electrical stress control materials on 25 kV cable.

Further, there are two failure modes possible in such testing and impulse withstand testing; external flashover, and internal degradation of the material caused by heat. External flashover is preferred as the termination is not destroyed and remains functional after the arc exinguishes. Terminations using materials of the invention have a failure mode of flashover as opposed to some using conventional sealants which have a degradation failure mode.

Finally, materials of the invention show stability and integrity even when aged in oil for extended periods of time at high temperatures. Terminations or joints formed from the materials of the invention will exhibit identical electrical properties, or even improved properties and structural integrity even after being immersed in polybutene oil (the type used in paper insulated lead cables) for 90 days at 90° C. Conventional materials, such as those containing EP or EPDM type rubbers will swell after such aging and lose the electrical properties, such as dielectric constant.

Hydrated aluminum silicate containing materials exhibit superior tan δ values while retaining useful permittivities.

Materials of the invention may also comprise a plasticizer. Useful plasticizers include aliphatic, naphthenic, and aromatic petroleum based hydrocarbon oils; cyclic olefins (such as polycyclopentadiene); polyalphaolefins (such as hydrogenated polymerized decene-1), hydrogenated terphenyls or other terpene derivatives; polypropylene oxide mono- and di-esters, cyclopentadiene copolymers with fatty acid esters; phosphate esters and mono-, di-, and poly-esters, (such as trimellitates, phthalates, benzoates, fatty acid ester derivatives, fatty acid ester alcohols, dimer acid esters, glutarates, adipates, sebacates, polymeric polyesters, rosin esters, acrylate esters, epoxidized fatty acid esters, and the like) and mixtures thereof.

Preferred plasticizers include phosphate esters and polyesters and polyethers such as adipates, phthalates, azelates, and the like, i.e., dioctylphthalate, and dioctylazelate. The latter is available from C. P. Hall, as Plasthall® DOZ. The plasticizer may be present in an amount up to 30 parts per hundred parts of resin.

The stress control materials may also include up to 15 parts (pph resin) of metal flake or other conductive filler such as aluminum flake, or copper flake. Aluminum flake, such as that available from Silberline Mfg. Company as Silvex ® 620-25-A, is preferred.

Materials of the invention may also contain minor amounts of other adjuvants such as antioxidants, dyes, pigments, flame retardants, release aids and the like so long as the addition does not negatively affect the electrical properties. Useful antioxidants include Agerite® MA, available from R. H. Vanderbilt Co. Useful process aids include fatty acids such as ATMER® 103, available from ICI Americas, and Kemamide ® U, available from Humko Chemicals.

Materials of the invention are especially useful in medium or high voltage power cables. The composition of the invention may be used alone, e.g., placed under an insulator of such cable in the region of the semiconductive cutback to fill voids. However, many cable joints or terminations use a pre-stretched stress control tube as well. Typically, pre-stretched tubes are provided on a rigid easily removable core. The core can be external or internal; however internal cores are preferable. Typical cores are such as those described in U.S. Pat. No. 3,515,798. Preferred terminations comprise a coordinated two-component or three-component stress-control system where the inner component is the conformable material of the invention, and the outer component is the high permittivity tubing. Alternatively, two layer structures include the material of the invention and an outer layer which is an insulator having high permittivity. A possible third layer is a polymeric insulator, typically a pre-stretched tube such as those described in U.S. Pat. No. 4,363,842.

When materials of the invention are used in such terminations, the electrical stress control is greatly improved, which allows a significant reduction in the required length of the termination. i.e., at least 20% reduction, which reduces costs and installation space requirements. Preferred materials may allow a length reduction of 40% or more. The application of silicone grease is no longer required, nor is the application of tape or other sealing materials at the ends of the termination, as it may be sealed with the stress control material, which is core loadable, permitting its automatic delivery.

Compositions of the invention are prepared by mixing the ingredients and then pressed, extruded, injection molded or calendared into the final form desired. The final product can be provided as sheets, shaped articles, or in putty form, as desired for the application.

The following examples are for illustrative purposes only, and are not meant to be limiting. One skilled in the art will easily think of variations within the scope of the invention, which is solely that defined by the claims.

Test Methods

Alternating Current Withstand and Basic Impulse Withstand Voltage Tests

The International Society of Electrical and Electronic Engineers (IEEE) sets the United States standard for high voltage cable; the test is conducted per IEEE-48. In order to determine the limit of AC withstand, AC withstand voltage is increased in steps of 5 kV per hour until flashover or internal degradation breakdown occurs. In order to determine the limit of impulse withstand, impulse voltage is raised in steps until flashover or internal degradation breakdown occurs.

Electrical Properties

Electrical properties (permittivity, tan δ) were tested according to ASTM-D150 using an impedance measurement method. The electrical properties were tested at an electrical stress of about 3 kV/cm to about 20 kV/cm.

Probe Tack Test

The probe test was performed according to ASTM D-2979.

Rubber Property-Plasticity and Recovery (Parallel Plate Method)

This test was performed according to ASTM D926-93, procedure A.

Adhesion to Core

For this test, a stress control material was placed onto a rigid core for an elastically shrinkable splice or termination by means of finger pressure. The core was then unwound, and the material was observed for deformation, fracture and adhesion to the core.

For samples which survived such test without deformation or fracture, another identical sample was placed on the core and an elastically shrinkable splice cover was placed onto the core. The sample was stored for 3 months, and then the core was unwound, and the material checked for deformation, fracture and adhesion to the core.

EXAMPLES

Example 1

Preparation of the Material 86.87 g of Hydrin® C-45, 115.15 g of Dow-Corning Silastic® GP3 silicone elastomer, 20.20 gms of dioctyl azelate, available as Plasthall DOZ®, 72.73 gm of Transelco 219-3 barium titanate, 2 gm Kemamide® U, and 3 gm of Silcogum® black 095 black pigment were placed in the order listed, with the barium titanate being added in two steps in an internal Banbury® mixer at 60–80 rpm and each ingredient permitted to mix before adding the next. After all ingredients were added, the ingredients were mixed until the batch temperature reached at least 70° C. The batch was then dropped from the mixer and placed in sheet form onto a two roll mill, adding any material remaining in the pan.

Other materials were prepared on a two roll mill by setting the roll temperature to 60° C., adding the epichlorohydrin, and allowing it to band both rolls, and then mix for about two minutes. The silicone was then added, and mixed until the color was even. The barium titanate and plasticizer were added together, and mixed until dispersed. The pigment was added and mixed. The batch was then removed and allowed to cool.

Preparation of Test Samples

Samples of from 1 mm to 3 mm in thickness were prepared by pressing between parallel metal plates in a hydraulic or pneumatic press, using shims to set the final plate separation.

First, the material was made as described above, and then a sample was cut, placed between the plates and pressed for 5 minutes. The sample was then inspected carefully to ensure no foreign matter or entrapped air was visible, as clean samples are required to insure proper dielectric testing.

Examples 2–4 and Comparative Examples C5–C8

These formulations of the invention were compounded as described in Example 1, except with differing ratios of resins and differing fillers. Suprex® clay is hydrated aluminum silicate, available from J. M. Huber Co. Example 4 contains no plasticizer.

During processing of various batches of material for Example C6, the batches became "nervy", i.e., it lost its smooth flowability and was lumpy, and difficult to further process into slabs or sheets. Clearly, processing time is critical, and good primary and secondary processing is very difficult to acheive with this material.

TABLE 1

| Ingredient/ Example No. (pph*) | 1 | 2 | 3 | 4 | C5 | C6 | C7 | 8 |
|---|---|---|---|---|---|---|---|---|
| Hydrin ® | 50 | 50 | 50 | 50 | 84 | 50 | — | 30 |
| Silastic ® GP31 | 50 | 50 | 50 | 50 | 16 | 50 | 60 | — |
| Wacker R300/30 | — | — | — | — | — | — | — | 70 |
| Nordel 1440 | — | — | — | — | — | — | 40 | — |
| Hectorite Clay | — | — | — | — | 4 | 20 | — | — |
| Plasthall DOZ ® | 10 | 10 | 10 | — | 5 | — | — | — |
| Suprex ® Clay | — | — | 29 | — | — | — | — | — |
| BaTiO$_2$ | 60 | 60 | — | 60 | — | — | 60 | 100 |
| Aluminum Flake | 8 | — | — | 8.5 | — | — | 8.5 | — |
| Kemamide ® U | 2 | 2 | 2 | 2 | 2 | 2 | 2 | 3 |
| SilicoBlack 95 | 3 | 3 | 3 | 3 | 3 | 3 | 3 | 3 |

*parts per hundred resin

The formulations described in Table 1 were then made into samples and electrical properties were tested. Results of those tests are shown in Table 2.

Example 4 was also tested in a termination having a tubular design, with a 21.6 cm insulation shield cutback, an overall length of approximatly 33 cm. The electrical stress control material was placed into the termination at a thickness of 2 mm. The termination was tested on a 25 kV 1/0 AWG cable, Jacketed Concentric Neutral. The AC Withstand was 120 kV with the failure mode being flashover, and the Maximum Impulse Withstand was +195 kV, and −196 kV, for Positive and Negative polarities, respectively.

Example C7 is an embodiment of U.S. Pat. No. 4,363,842 (Nelson). As is shown in Table 2 below, a material using a silicone/EPDM construction rather than the silicone epihalohydrin blend resins of the invention. Such material does not have a good dielectric constant even when 8.5 parts of aluminum flake is added, only reaching 4.47.

It is desirable to have a combination of a dielectric constant above 9, preferably above 10, and a tan δ of less than 4. Note that for the comparative examples C5 and C7, this combination is not met, while each of the examples of the invention meets these criteria. C5 becomes resistive, e.g., at high stresses, which is extremely undesirable. Comparative example C6 shows reasonable electrical properties; however, as noted above, processing of this material is very difficult.

TABLE 2

| Elec Properties/ Example No. | 1 | 2 | 3 | 4 | C5 | C6 | C7 |
|---|---|---|---|---|---|---|---|
| tan δ * | 2.9 | 2.8 | 0.77 | 2.9 | 58 | 3.3 | .022 |
| dielectric constant * | 49 | 36 | 11 | 49.2 | 28 | 17.7 | 4.47 |

*These numbers are the average dielectric constant and dissipation factor, tan δ, over electrical stresses from 3,000–20,000 v/cm.

Example 8

A sample was made according to the invention containing the following ingredients; 30 parts Hydrin ® C-45, and 70 parts Wacker R300/30 silicone, 100 pph Transelco $BaTiO_2$, 3 pph Kemamide ® U, and 3 pph Silicogum Black 0.095. The composition was tested for electrical properties as discussed above, and found to have an average dielectric constant of 35, and an average tan δ of 0.97. The sample had an average plasticity according to ASTM D926-93 of 235.

The sample was then aged in cable oil, i.e., polybutene oil for 90 days and 90° C. The dielectric constant rose an average of 2% after such aging.

Example C9

An example of the mastic disclosed in U.S. Pat. No. 4,378,463 was prepared as described. This sample along with samples 1, 2 and 3 of the invention were subjected to the probe tack test. Example C9 had an adhesion to the core such that upon unwinding the core, the adhesive deformed and fractured along the separating helical core weld lines, and remained firmly adhered to the unwound core strand.

The Examples of the invention all allowed unwind without any visible deformation or fracture, and did not adhere to the core. Further samples of Examples 1–3 were then placed upon cores, and elastically shrinkable material of U.S. Pat. No. 4,363,842 was placed thereover. These were stored at ambient temperatures for 60 and 90 days, and then removed. The electrical stress control material even after such storage associated with the elastomerically shrinkable material and did not adhere to the core, nor were any deformations or fractures visible.

A room temperature probe tack was also run on Example C9, and Examples 1–3. The results were as shown in Table 3.

TABLE 3

| Ex. | Temp (° C.) | Dwell Time (s) | Probe Speed (cm/s) | Sample Holder | Max. Force (g) | Comments |
|---|---|---|---|---|---|---|
| C9 | 23 | 100 | 0.01 | aluminum | 101 | did not debond |
| C9* | 23 | 20 | 0.01 | aluminum | 283 | did not debond |
| 1 | 23 | 100 | 0.01 | aluminum | Not Applicable | no adhesion |

*Steel backing used to limit deformation of material.

Example 10

A sample was made according to the invention containing the following ingredients: 30 parts Hydrin® C-45, and 70 parts Wacker 7805 silicone, 100 pph Transelco $BaTiO_2$, 3 pph Kemamide® U, and 3 pph Silicogum Black 0.095. The composition was tested for electrical properties as discussed above, and found to have an average dielectric constant of 28.34 and an average tan δ of 0.85. The sample had an average plasticity according to ASTM D926-93 of 208.

As stated earlier, the highest electrical stress of a prepared cable 22 occurs at the cut back end of the semi-conductive insulation shield 30. The present invention coordinates two components held to specific relative geometries based on their permittivities to provide stress control.

The inner conformable stress control material 20 is positioned to extend in both directions from the cut edge of the shield 30 and should have a thickness sufficient to fill the radial step from the outer surface of the cable insulation 28 to the outer surface of the shield 30. The stress control tube 18 covers the conformable stress control material 20 and extends beyond the conformable stress control material 20 in both directions from the edge of the shield 30.

The maximum internal electrical stress at the cable insulation 28 is primarily affected by the permittivity of the conformable stress control material 30. The relationship to approximate the maximum stress is:

$$S_{internal\ maximum} = (V/(R \ln (R/r)))A$$

where:

$$A = 1.69 - 1.63 \times 10^{-2} \epsilon_p,$$

V is the applied voltage;
R is the outside radius of the cable insulation;
r is the inside radius of the cable insulation; and
$\epsilon_p$ is the permittivity of the conformable stress control material.

The permittivity of the conformable stress control material must be high enough to prevent its breakdown at the maximum power frequency voltage withstand required for the cable and its attached termination to achieve the required voltage rating in accordance with industry standard tests. The breakdown strengths for the conformable stress control materials tested were about 11800 V/mm. The minimum values for the permittivity of the conformable stress control material at selected voltage levels are shown in Table 4 below:

TABLE 4

| Voltage Class (kV) | Power Frequency Voltage Withstand (kV for 1 minute) | V/ (R ln (R/r))$_{MAX}$ for 2500 MCM (V/mm) | $\epsilon_{p(min)}$ for $V_{BD}$ = 11800 V/mm |
|---|---|---|---|
| 5.0 | 25 | 10450 | 34 |
| 8.7 | 35 | 11320 | 40 |
| 15 | 50 | 8365 | 17 |
| 25 | 65 | 8735 | 21 |
| 28 | 70 | 8665 | 20 |
| 34.5 | 90 | 8820 | 22 |
| 46 | 120 | 8810 | 21 |
| 69 | 175 | 8245 | 16 |

As can be seen, the permittivity of the comformable stress control material should be at least about 16. Since the most common voltage range is 15 to 69 kV, the preferred value for the permittivity is greater than 22, and most preferably is greater than 25.

The maximum electrical stress along the outer surface of the termination sleeve 12 adjacent to either the end of the cable shield 30 or the end of the stress controlling compound 20 is affected by many parameters. The relationship to approximate this maximum stress is:

$$S_{external\ maximum} = (V/(R\ln(R/r)))B$$

where:

$$B = 0.585 + 1.76 \times 10^{-3} \in_p - 2.43 \times 10^{-3} \in_t + 7.32 \times 10^{-5} l_p - 4.45 \times 10^{-2} t_t - 3.39 \times 10^{-2} t_p - 4.45 \times 10^{-5} \in_p l_p$$

where:

$\in_p$ is the conformable stress control material's permittivity;
$\in_t$ is the stress control tube's permittivity;
$l_p$ is the length of the conformable stress control material over the cable insulation in millimeters;
$t_t$ is the thickness of the stress control tube in millimeters; and
$t_p$ is the thickness of the conformable stress control material in millimeters.

This relationship assumes a thickness of the termination sleeve 12 of about 2 mm. This thickness being the thinnest which will withstand voltage breakdown through the sleeve 12 to conserve material. Increased thickness of the sleeve 12 will also reduce stress at the outer surface of the sleeve 12.

The maximum permissible external stresses, S, must be below a level which would cause electrical breakdown of air during impulse conditions. The impulse breakdown strength for terminations was found to be between about 3000 and 9200 Volts/mm. The preferred embodiment should maintain stress at required impulse levels at about 3150 Volts/mm. The maximum permissible values for B at Voltages of interest are listed in Table 5 below:

TABLE 5

| Voltage Class (kV) | Lightning Impulse BIL (kV) | V/ (R ln (R/r))$_{MAX}$ For 2500 MCM (V/mm) | B$_{(MAX)}$ for V$_{BD}$ = 9200 V/mm |
|---|---|---|---|
| 5.0 | 75 | 800 | .292 |
| 8.7 | 95 | 780 | .300 |
| 15 | 110 | 465 | .499 |
| 25 | 150 | 510 | .456 |
| 28 | 175 | 550 | .423 |
| 34.5 | 200 | 500 | .470 |
| 46 | 250 | 465 | .502 |
| 69 | 350 | 420 | .558 |

From the relationship for B given above it can be seen that increases in the permittivity of the conformable stress control material 20 and the length of the conformable stress control material 20 unexpectedly tends to increase the stress at the outer surface of the sleeve 12, although this is offset somewhat by the last term of the relationship for B, wherein it can be seen that the product of the permittivity and length of the conformable stress control material 20 tends to decrease this stress. Increases in the permittivity and thickness of the stress control tube 18 both tend to decrease the stress at the outer surface of the sleeve 12, and strongly so. As stated above, increased thickness of the termination sleeve 12 will also reduce the stress at the outer surface of the sleeve 12. However, this thickness is maintained at near the minimum required to act as a sacrificial covering from electrical erosion, since the silicone from which the sleeve 12 is made is relatively expensive. Sleeve 12 preferably extends at least 20 mm past the end of the stress control tube 18 to create an adequate moisture seal, while at the lug end of the termination, sleeve 12 extends onto the lug itself, preferably for a distance of at least 10 mm.

In practice, it is preferred that the thickness of the conformable stress control material 20 be at least as thick as the thickness of the cable insulation and shield, which ranges from about 0.75 mm to 2.6 mm depending upon the voltage and cable type. Preferably, the stress control material 20 has a thickness of at least 3 mm to ensure that the material 20 completely fills the step at the cut end of the shield 30 and at the cut end of the insulation 28. The length of the conformable material 20 is at least 10 mm and preferably more than 30 mm along the cable insulation 28, in addition it is preferred that the conformable material extend at least about 5 mm, and preferably about 20 mm, on top of the cable shield 30 to ensure intimate contact with the insulation shield 30, although this extension is not necessary so long as there is contact between the conformable stress control material 20 and the cable shield 30 around the entire circumference of the shield.

The stress control tube 18 preferably extends along shield 30 for at least 10 mm, and more preferably for about 25 mm. Stress control tube 18 also preferably extends along insulation 28 in the range of at least 50 mm to at least 150 mm for 15 kv to 35 kV terminations, respectively. The thickness of the tube 18 is preferably at least 1 mm and most preferably between 2 and 3 mm.

Manipulation of these various parameters permits one to predict, for example, the necessary permittivity of the stress control tube 18 to be determined based on dimensions given or allows one to predict the dimensions the two stress control components must assume for given permittivities of the materials.

The use of the two component stress control system described above consisting of the conformable stress control material 20 and the stress control tube 18 greatly improves stress control over approaches in the past, and so permits either improved electrical performance for a give termination length or allows a reduction in termination length (about 40% of prior devices) at a given performance level. Of course, these advantages may be combined to produce a somewhat shorter termination with improved electrical performance. Since all components may be loaded on the core 14 of the termination assembly 10, application of the components is a one-step process and so is very economical and convenient.

The use of the two component stress control system described above (having conformable stress control material in contact with the end of the cable shield and extending along the cable insulation, and then covered by a polymeric stress control tube) so greatly improves stress control over prior art approaches that the stress adjacent the lug becomes surprisingly significant. For example, in a termination without stress control the stress adjacent the cut cable shield can be approximately 100 times as great as the stress at the lug end of the termination, perhaps 1000 kV/cm at the cut shield and 10 kV/cm at the lug end. The two component stress control system is effective in reducing the stress adjacent the cut shield to the point where the surface sintilations at the lug end can occur on the surface of the termination.

Until the introduction of the two component stress control system, there was no interest in addressing stress control at the lug end of the termination, because the stress adjacent the lug was insignificantly small compared to the stress adjacent the cut shield. However, short terminations with the improved large reduction in stress adjacent the cut shield allows stress control adjacent the lug to be addressed. Stress control adjacent the lug becomes important because the shorter termination lengths which are possible with the two component stress control system cause electrical stresses in the vicinity of the lug to rise to a level which may be significant.

Prior art terminations, including the termination shown in FIGS. 1–3, utilize a silicone sealing compound 40 adjacent the lug end of the termination to remove air voids around the lug and to provide a weather tight seal. It has been discovered that by replacing the silicone sealing compound 40 with the inventive stress control compound disclosed herein, electrical stress adjacent the lug is significantly reduced. In particular, this second embodiment of the inventive termination having a first region of stress control material 20 (in contact with the cut end of shield 30) and a second region of stress control material 21 (in contact with the cut end of the cable insulation 28 and lug) exhibits improved AC withstand performance and impulse withstand performance.

Figure 6:
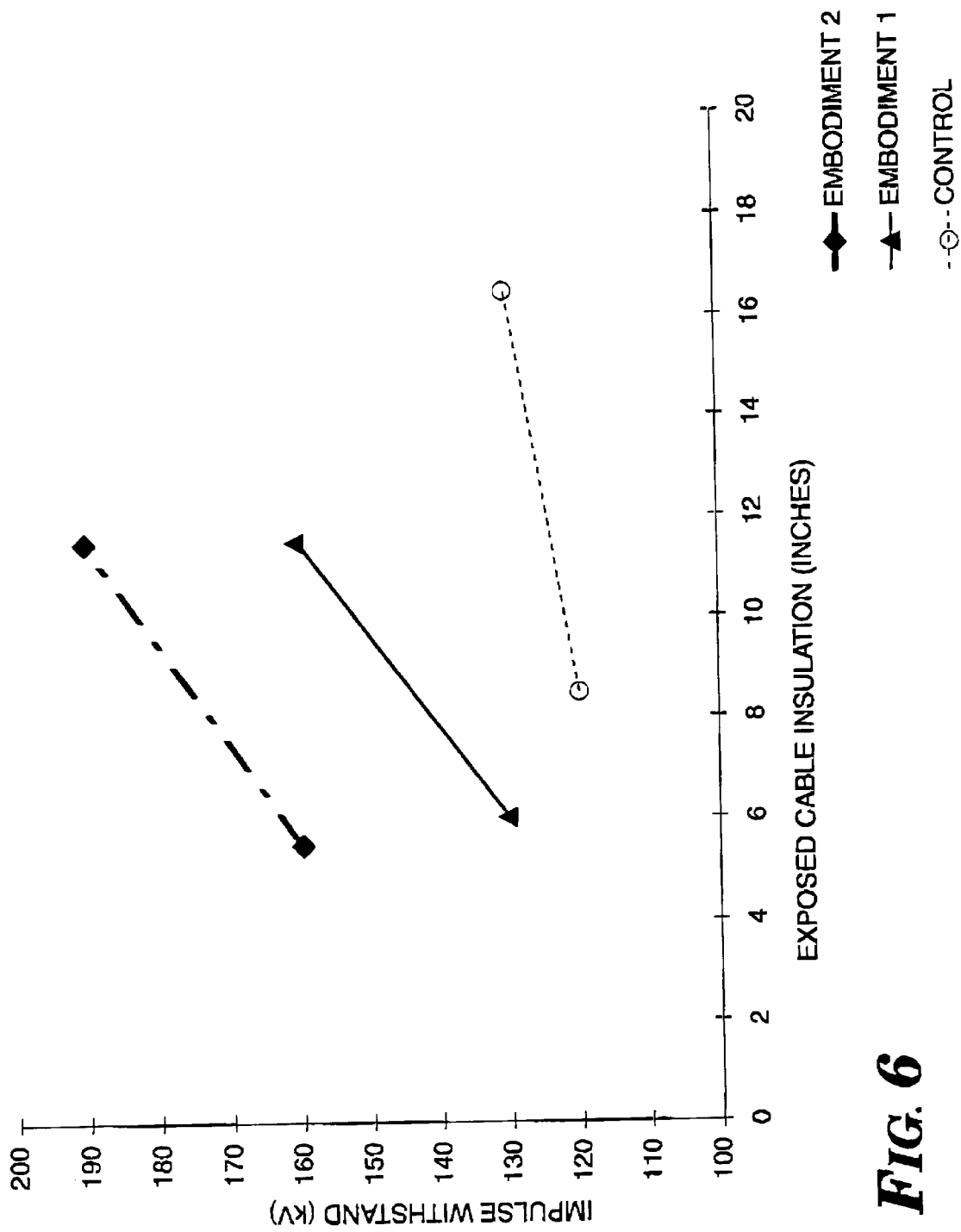
FIGS. 6 and 7 are graphs comparing the performance of a tubular termination without stress control compound, with the inventive conformable stress control compound adjacent the cut end of the cable shield only, and with the inventive conformable stress control compound adjacent both the cut end of the cable shield and the cut end of the insulation and lug.
Figure 7:
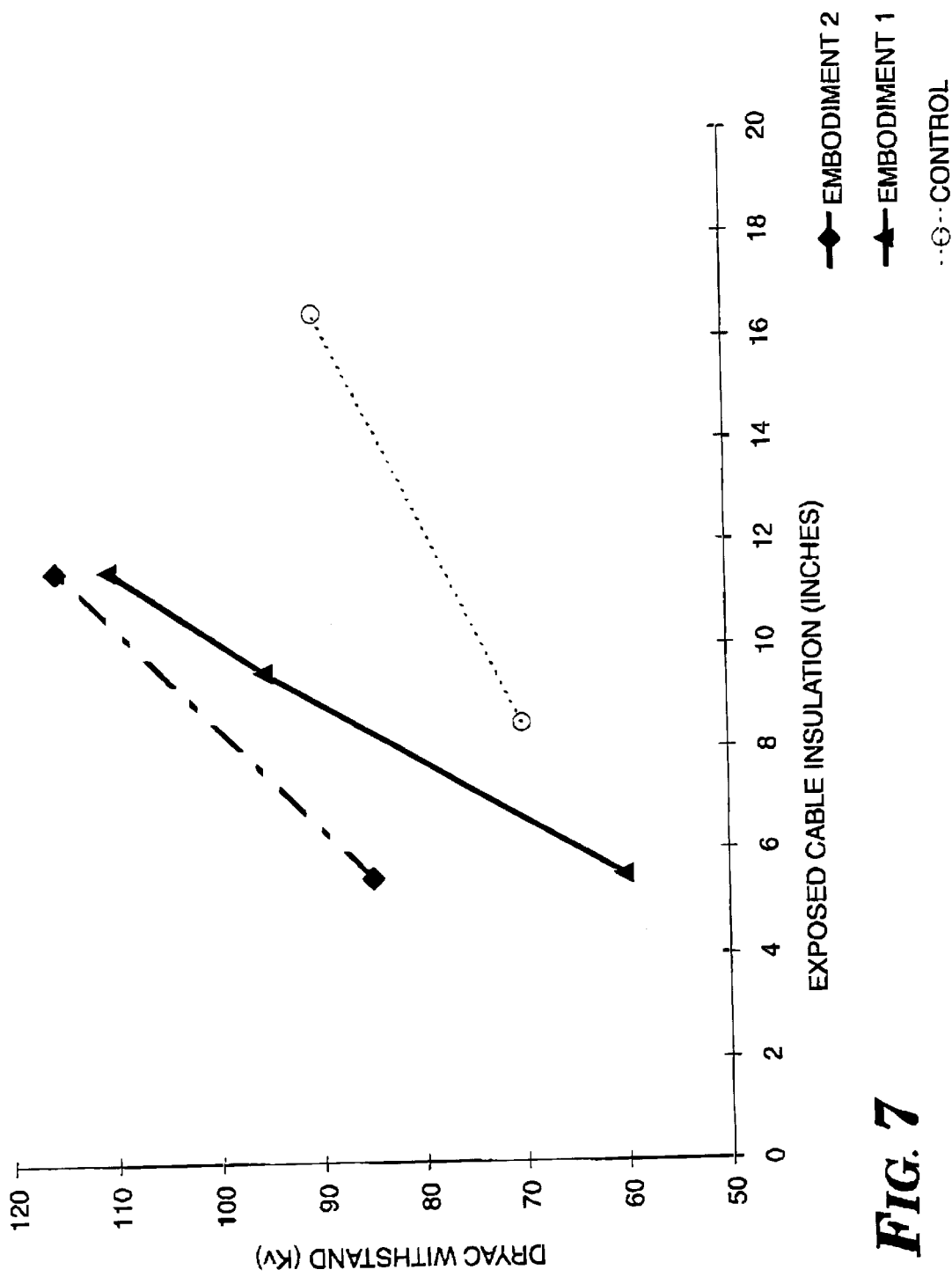

The levels of improved performance exhibited by the first and second embodiments of the inventive terminations are illustrated in FIGS. 6 and 7.

FIGS. 6 and 7 compare performance of a tubular termination without stress control compound (Control), with the inventive conformable stress control compound adjacent the cut end of the cable shield 30 only (Embodiment 1), and with the inventive conformable stress control compound adjacent to both the cut end of the shield 30 and the cut end of the insulation 28 and lug (Embodiment 2). A stress control tube is used in all examples. Although FIGS. 6 and 7 illustrate performance of tubular terminations, similar relative performance improvements would be expected with skirted terminations.

As can be seen from FIGS. 6 and 7, the introduction of first region of stress control compound 20 adjacent the cut end of shield 30 produces superior performance to a termination without stress control compound, and use of second region of stress control compound 21 adjacent the cut end of insulation 28 and lug results in a termination which exhibits even better performance for a given termination length. Accordingly, terminations may be made shorter for a given performance level.

Additional benefits of the inventive termination can be seen from the test results shown in Table 6 below:

TABLE 6

| Embodiment 1 | | | Embodiment 2 | | |
| --- | --- | --- | --- | --- | --- |
| kV-RMS | Minutes | Temp (C.) | kV-RMS | Minutes | Temp (C.) |
| 20 | 60 | 22 | 20 | 60 | 22 |
| 25 | 60 | 23 | 25 | 60 | 23 |
| 30 | 60 | 23 | 30 | 60 | 25 |
| 35 | 60 | 24 | 35 | 60 | 27 |
| 40 | 60 | 26 | 40 | 60 | 31 |
| 45 | 60 | 27 | 45 | 60 | 34 |
| 50 | 60 | 29 | 50 | 60 | 39 |
| 55 | 60 | 32 | 55 | 60 | 44 |
| 60 | 60 | 35 | 60 | 60 | 48 |
| 65 | 60 | 39 | 65 | 60 | 53 |
| 70 | 60 | 43 | 70 | 60 | 58 |
| 75 | 60 | 48 | 75 | 60 | 62 |
| 80 | 60 | 52 | 80 | 1* | 63 |
| 85 | 60 | 56 | N/A | N/A | N/A |
| 90 | 60 | 61 | N/A | N/A | N/A |
| 95 | 60 | 66 | N/A | N/A | N/A |
| 100 | 4* | 68 | N/A | N/A | N/A |

*Termination Flashover Occurred

For each of the embodiments described above, Table 6 shows the temperature of the termination after application of a specified voltage for a given time (60 minutes in this case). As can be clearly seen, Embodiment 2 (which has stress control material at the cut end of the shield and lug) has significantly lower temperatures for a given voltage, and does not experience flash-over until a much higher voltage is reached.

It will be recognized that multiple variations of the inventive termination are possible, depending upon the particular application of the termination. In particular, the polymeric stress control tube 18 may be omitted from the termination entirely (not shown), or may extend between the first and second regions of stress controlling material 20, 21, or may be disposed over only one or both of the regions of conformable stress control material 20, 21. FIG. 4 shows the stress control tube 18 extending between the first and second regions of stress control material 20, 21, while FIG. 5 shows the stress control tube 18 extending only over the first region of stress control material 20. The first and second regions of stress controlling material 20, 21 may also be extended through the termination such that the first and second regions 20, 21 contact each other (not shown).

The use of the stress control system described above consisting of the two regions of conformable stress control material greatly improves stress control over approaches in the past, and so permits either improved electrical performance for a give termination length or allows a reduction in termination length at a given performance level. Since all components may be loaded on the core 14 of the termination assembly 10, application of the components is a one-step process and so is very economical and convenient.

What is claimed is:

1. An elastically recoverable termination for an electrical power cable including an inner conductor, electrical insulation surrounding the conductor and a semi-conductive shield surrounding the insulation, wherein the shield is removed to a predetermined length and the insulation is removed to a lesser predetermined length to expose the conductor, the termination comprising:

a first region of non-tacky conformable stress control material for contact with a cut end of the cable shield and extending along the cable insulation;

a second region of non-tacky conformable stress control material to be disposed in contact with a cut end of the cable insulation; and a polymeric electrically insulating layer extending the entire length from a first end of the termination to a second end of the termination, the electrically insulating layer disposed over said first and second regions of stress control material;

wherein the non-tacky stress control material comprises
   a) 100 parts of a resin component containing
      1) from 20% to 80% of an epihalohydrin polymer, and
      2) correspondingly, from 80% to 20% of an insulating silicone polymer having a tan δ of less than one,
   b) from 10 to 200 parts of a filler, said filler being nonconductive at room temperature, selected from the group consisting of barium titanate and hydrated aluminum silicate, and
   c) from 0 to 30 parts of a plasticizer.

2. The termination of claim 1, further comprising:
   a polymeric stress control tube extending between said first and second regions of conformable stress control material.

3. The termination of claim 1, further comprising:
   a polymeric stress control tube disposed over said first region of conformable stress control material.

4. The termination of claim 1, further comprising:
   a polymeric stress control tube disposed over said second region of conformable stress control material.

5. The termination of claim 1, wherein the first and second regions of conformable stress control material contact each other.

6. The termination of claim 1, wherein the permittivity $\in_p$ of said conformable stress control material is at least about 16.

7. The termination of claim 1, wherein the permittivity $\in_p$ of said conformable stress control material is between about 20 and 50.

8. The termination according to claim 1 wherein said stress control material has a tan δ of less than 4 where said material is tested under electrical stress of at least 3 kV to 20 kV/cm.

* * * * *